(12) United States Patent
Goto et al.

(10) Patent No.: US 11,428,867 B2
(45) Date of Patent: Aug. 30, 2022

(54) OPTICAL SUBASSEMBLY STRUCTURE

(71) Applicant: Cloud Light Technology Limited, Hong Kong (HK)

(72) Inventors: Masanori Goto, Kumamoto (JP); Jun Ming Bai, Guangdong (CN); Fuk Ming Lam, Hong Kong (HK); Chi Yan Wong, Hong Kong (HK); Hau Chen Loke, Penang (MY)

(73) Assignee: Cloud Light Technology Limited, Hong Kong (HK)

( * ) Notice: Subject to any disclaimer, the term of this patent is extended or adjusted under 35 U.S.C. 154(b) by 0 days.

(21) Appl. No.: 16/896,208

(22) Filed: Jun. 8, 2020

(65) Prior Publication Data

US 2020/0393621 A1    Dec. 17, 2020

Related U.S. Application Data

(60) Provisional application No. 62/861,347, filed on Jun. 14, 2019.

(51) Int. Cl.
| | |
|---|---|
| *G02B 6/30* | (2006.01) |
| *G02B 6/14* | (2006.01) |
| *G02B 6/255* | (2006.01) |
| *G02B 6/42* | (2006.01) |

(52) U.S. Cl.
CPC .................. *G02B 6/30* (2013.01); *G02B 6/14* (2013.01); *G02B 6/255* (2013.01); *G02B 6/422* (2013.01)

(58) Field of Classification Search
CPC .......... G02B 6/136; G02B 6/255; G02B 6/30; G02B 6/3644; G02B 6/421; G02B 6/4225; G02B 6/4292; G02B 6/14; G02B 6/422; G02B 6/4295; H01L 31/0232; H01L 31/12
USPC ......................................... 385/27–28, 95–96
See application file for complete search history.

(56) References Cited

U.S. PATENT DOCUMENTS

| | | | | |
|---|---|---|---|---|
| 6,712,526 | B1* | 3/2004 | Fleenor | B24B 19/226 385/78 |
| 7,190,864 | B2* | 3/2007 | Jiang | G02B 6/262 385/123 |
| 9,102,563 | B2* | 8/2015 | Laughlin | B01J 19/087 |
| 9,335,480 | B1* | 5/2016 | Celo | G02B 6/4225 |
| 2003/0161595 | A1* | 8/2003 | Dallas | G02B 6/255 385/96 |
| 2013/0308910 | A1* | 11/2013 | Nishimura | G02B 6/3829 385/78 |
| 2014/0010498 | A1* | 1/2014 | Verslegers | G02B 6/30 385/37 |
| 2014/0314422 | A1* | 10/2014 | Shao | G02B 6/4214 398/138 |
| 2020/0041723 | A1* | 2/2020 | Nakahara | G02B 6/1228 |
| 2020/0284978 | A1* | 9/2020 | Kharas | H01L 31/0232 |
| 2021/0181423 | A1* | 6/2021 | Miao | G02B 6/32 |

\* cited by examiner

*Primary Examiner* — Michael P Mooney

(57) ABSTRACT

An optical subassembly structure for mode conversion by an active alignment of an optical fiber with a semiconductor optical waveguide includes a sub-mount for holding the optical subassembly structure, a semiconductor die mounting on the sub-mount, the semiconductor optical waveguide growing on the semiconductor die and a glass capillary subassembly actively aligned to the semiconductor optical waveguide.

17 Claims, 16 Drawing Sheets

OPTICAL SUBASSEMBLY STRUCTURE

CROSS-REFERENCE TO RELATED APPLICATIONS

This application claims the benefit of U.S. provisional application No. 62/861,347, titled "Optical Subassembly and Alignment Method with Glass Capillary" filed by the applicant on Jun. 14, 2019, which is incorporated herein by reference in its entirety.

FIELD OF THE INVENTION

Embodiments of the present invention relate to an optical subassembly structure used in optical transceivers of optical communication systems. And more particularly, relates to the optical subassembly structure for active alignment between optical fiber and semiconductor waveguide.

BACKGROUND OF THE INVENTION

In the era of information, there is no doubt that information technology has an exponential growth through modern communication systems. Optical fiber communication plays a vital role in the development of high-quality and high-speed telecommunication systems. In particular, the optical fiber transmission is instrumental in the development of many advanced applications for telecommunications and data communications. Moreover, the optical fiber transmission needs local fiber access to provide two-way communications to the home through an optical transceiver, which is composed of a driver circuit, an electrical subassembly (ESA), and an optical subassembly (OSA).

A modern optical communication network is constructed by transmitting and receiving circuitry, responsible for optical signal transmission by converting electrical signal to optical signal and vice versa. Data center as a hub of the modern communication network, is spurring growth in the market by the internet and clouding computing requirements. Along with the constant upgrade and anticipation of optical interconnection speed and density, anxiety to have the systematic design of the data center with the high calculation ability, storage ability and interconnection ability increases.

Nowadays, the considerations are focusing on the parallel single mode 4-channel optical transceiver (PSM4) technology and coarse wavelength division multiplexing 4-wavelength (CWDM4) technology for the 100G Ethernet in data centers.

In particular, the supplement of multi-mode 100G data center, PSM4 technology uses the single-mode MPO fiber transmission to reach more than 2 KM transmission distance by employing 4 fiber quantities. Moreover, the CWDM4 technology is an advantageous alternative replacement under the situation of the limit of fiber resources. The key components in these two technologies are the transmitter and receiver. Normally, the transmitter optical subassembly (TOSA) is the integrated transmitter package system to ensure the transceiver transfers the electric signal to the optical signal. And, the Receiver optical subassembly (ROSA) is the integrated receiver package system to ensure that the transceiver transfers the optical signal to the electric signal.

The conventional way of coupling light from optical fiber to semiconductor optical waveguide is done by adding optical lenses in between them. By keeping optical fiber fixed, the position of optical waveguide and lenses are fine-tuned (active aligned) to give the best coupling efficiency. Although this approach is straight-forward, it needs very high precision (down to 0.05-micron scale) and complex machine to maintain good coupling. Thus, making the assembly cost very high.

Further, the mode field of conventional single-mode optical fiber is about 9 μm wide while the conventional semiconductor optical waveguide is down to around 3 μm. Such mode field size mismatch between two media gives rise to a high optical transmission and reflection loss. Thus, the optical link performance characterized by bit-error-rate (BER) is also degraded. Thus, to overcome the problem of mode field size mismatch between two optical waveguides an Optical mode convertor structure is usually added.

Thus, the present invention is aimed to provide an optical subassembly structure that overcomes the above-discussed drawbacks of the conventional optical subassemblies. In particular, the optical subassembly structure is robust in design with inexpensive coupling performance.

SUMMARY OF THE INVENTION

One embodiment of the present disclosure relates to an optical subassembly structure for mode conversion by an active alignment of an optical fiber with a semiconductor optical waveguide. In particular, the optical subassembly structure includes a sub-mount for holding the optical subassembly structure, a semiconductor die mounting on the sub-mount, the semiconductor optical waveguide growing on the semiconductor die and a glass capillary subassembly active-aligned to the semiconductor optical waveguide.

In accordance with an embodiment of the present invention, the glass capillary subassembly includes a glass capillary block, an optical fiber subassembly.

In accordance with another embodiment of the present invention, the glass capillary subassembly includes an optical connector. In particular, the optical connector may be anyone of a conventional optical connector another piece of optical fiber.

In accordance with an embodiment of the present invention, the glass capillary block further includes a glass capillary tube and a funnel-shaped hole. In particular, the glass capillary tube is positioned co-linearly to the funnel-shaped hole.

In accordance with an embodiment of the present invention, the optical fiber subassembly further includes a plurality of optical fibers joined by fusion splicing. In the plurality of optical fibers is selected from an optical fiber enclosed in an optical fiber jacket and an optical fiber enclosed in the glass capillary tube.

In accordance with one embodiment of the present invention, the optical fiber subassembly is a multi-optical fiber subassembly. In particular, the multi-optical fiber subassembly has two or more optical fibers selected from the plurality of the optical fibers.

In accordance with another embodiment of the present invention, the optical fiber subassembly is a single optical fiber subassembly. In particular, the single optical fiber subassembly has one optical fiber selected from the plurality of the optical fibers.

In accordance with an embodiment of the present invention, the optical fiber subassembly is inserted inside the glass capillary tube. In particular, the inserted optical fiber subassembly inside the glass capillary tube acts as a mode convertor.

In accordance with an embodiment of the present invention, the optical fiber subassembly is inserted inside the glass capillary tube forming an epoxy drop in the funnel-shaped hole to prevent bending of the front surface of the optical fiber and polishing a front surface of the glass capillary tube to align the front surface of the glass capillary tube with the front surface of the optical fiber. In particular, the front surface of the glass capillary tube aligns with the front surface of the optical fiber in a coplanar plane.

In accordance with an embodiment of the present invention, the optical fiber subassembly is active-aligned to the optical waveguide.

In accordance with an embodiment of the present invention, the optical subassembly structure is formed by a direct butt coupling of the glass capillary subassembly with the optical semiconductor optical waveguide at an edge of the semiconductor die.

In accordance with an embodiment of the present invention, the size of the sub-mount is smaller than the semiconductor die.

In accordance with an embodiment of the present invention, the glass capillary subassembly further includes an external mode convertor. In particular, the external mode convertor is active aligned to the single optical fiber subassembly. Moreover, the external mode convertor is positioned on a front surface of the glass capillary block.

In accordance with an embodiment of the present invention, the glass capillary block is a glass capillary array block. In particular, the glass capillary array block further includes a plurality of optical fibers.

In accordance with another embodiment of the present invention, the plurality of optical fibers may be equidistant optical fibers.

In accordance with an embodiment of the present invention, the optical subassembly structure further comprises the glass capillary array block, a waveguide array. In particular, the optical waveguide further includes the two optical waveguides at two far ends and optical waveguide in between two optical waveguides.

In accordance with an embodiment of the present invention, the distance between the sub-mount and the glass capillary block is less than 1 mm.

In accordance with an embodiment of the present invention, the size of the sub-mount is smaller than the semiconductor die.

In accordance with an embodiment of the present invention, the front surface of the glass capillary tube and the front surface of the optical fiber subassembly align in a coplanar plane.

In accordance with an embodiment of the present invention, the optical fiber subassembly is placed in the centre of the glass capillary block from the front surface of the glass capillary tube.

In accordance with an embodiment of the present invention, particularly in TOSA application, the mode field size of the outgoing light is converted within optical fiber subassembly and is guided to optical connector and outside.

In accordance with an embodiment of the present invention, particularly in the ROSA application, the mode field size of incoming light is converted within the optical fiber subassembly and is guided into semiconductor optical waveguide.

In accordance with one embodiment of the present invention, the optical fiber subassembly is anyone of a single optical fiber subassembly and a multi-optical fiber subassembly. In particular, the single optical fiber subassembly includes an optical fiber enclosed in an optical fiber jacket. And, the multi-optical fiber subassembly includes a plurality of optical fibers fusion spliced with at least one optical fiber enclosed in the optical fiber jacket.

In accordance with an embodiment of the present invention, the glass capillary subassembly further includes a mode convertor. And the mode convertor is an internal mode convertor and an external mode convertor. In particular, the multi-optical fiber subassembly inserted in the glass capillary tube of the glass capillary block acts as the internal mode convertor.

The foregoing objectives of the present invention are attained by employing the optical subassembly structure for coupling light by active alignment of an optical fiber with a semiconductor optical waveguide.

BRIEF DESCRIPTION OF THE DRAWINGS

So that the manner in which the above recited features of the present invention is be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

ELEMENT LIST

100—Optical Subassembly Structure
106—Optical Connector
201—Epoxy
202—Epoxy Drop
203—Funnel-shaped Hole
301—Glass Capillary Tube
302—Capillary Front Surface
303—Capillary Back Surface
602—Single Optical Fiber Subassembly
901,1101—Glass Capillary Array Block
902, 1102—Plurality of Optical Fibers
904—Waveguide Array
Following reference numbers are used interchangeably for convenience and better understanding of exemplary examples in the various embodiments of the present invention:
101,601—Glass Capillary Block
102, 107—Optical Fiber Subassembly
103, 603, 903, 1103—Semiconductor Die
104,604, 907, 908—Semiconductor Optical Waveguide
105, 605, 905, 1105—Sub-mount
401,402,404-409, 802,804—Optical Fiber
403, 803—Optical Fiber Jacket
501,701, 1000, 1100—Glass Capillary Subassembly
901,1101—Glass Capillary Array Block
902, 1102—Plurality of Optical Fibers
606,1106—External Mode Convertor

DETAILED DESCRIPTION

The present invention relates to an optical subassembly structure for mode conversion by an active alignment of an optical fiber with a semiconductor optical waveguide.

The principles of the present invention and their advantages are best understood by referring to FIG. 1 to FIG. 12. In the following detailed description of illustrative or exemplary embodiments of the disclosure, specific embodiments in which the disclosure may be practiced are described in sufficient detail to enable those skilled in the art to practice the disclosed embodiments.

The following detailed description is, therefore, not to be taken in a limiting sense, and the scope of the present disclosure is defined by the appended claims and equivalents thereof. References within the specification to "one embodiment," "an embodiment," "embodiments," or "one or more embodiments" are intended to indicate that a particular feature, structure, or characteristic described in connection with the embodiment is included in at least one embodiment of the present disclosure.

Various embodiments of the present invention provide an optical subassembly structure for mode conversion by an active alignment of an optical fiber with a semiconductor optical waveguide.

Figure 1:
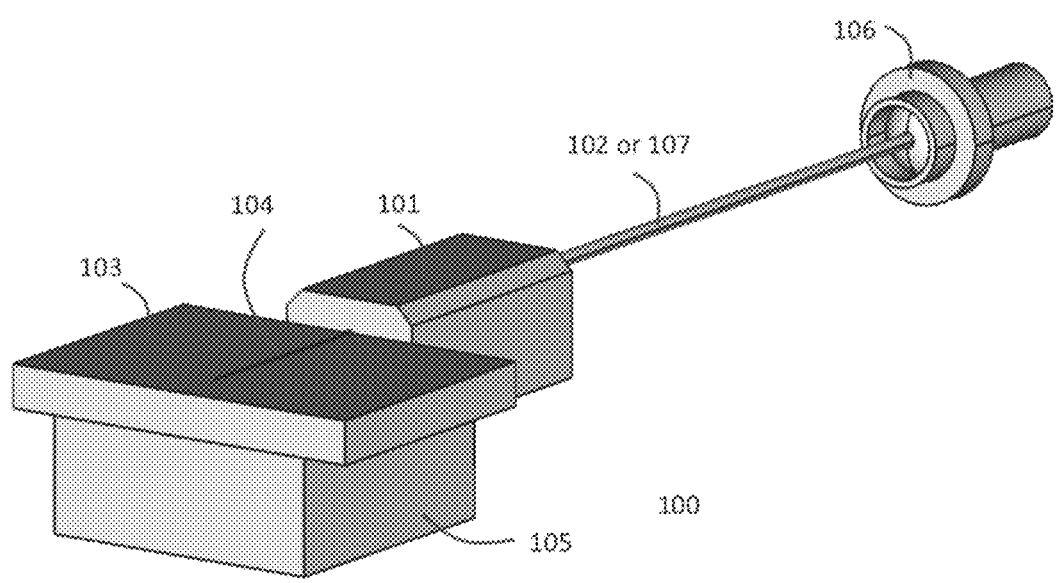
FIG. 1 is a pictorial representation illustrating an isotropic view of the optical subassembly structure in accordance with an embodiment of the present invention.

FIG. 1 is a pictorial representation illustrating an isotropic view of the optical subassembly structure 100 in accordance with an embodiment of the present invention. The optical subassembly structure 100 is an optical subassembly structure for mode conversion by an active alignment of an optical fiber with a semiconductor optical waveguide.

In particular, the optical subassembly structure 100 includes a sub-mount (105) for holding the optical subassembly structure 100, a semiconductor die (103) mounted on the sub-mount (105) and a glass capillary subassembly (501) actively-aligned to the semiconductor optical waveguide (104).

Moreover, the semiconductor optical waveguide (104) grows on the semiconductor die (103). Furthermore, the glass capillary subassembly (502) further includes a glass capillary block (101) and an optical fiber subassembly (102 or 107) and an optical connector (106).

In accordance with an embodiment of the present invention, the distance between the sub-mount and the glass capillary block is less than 1 mm.

Figure 2:
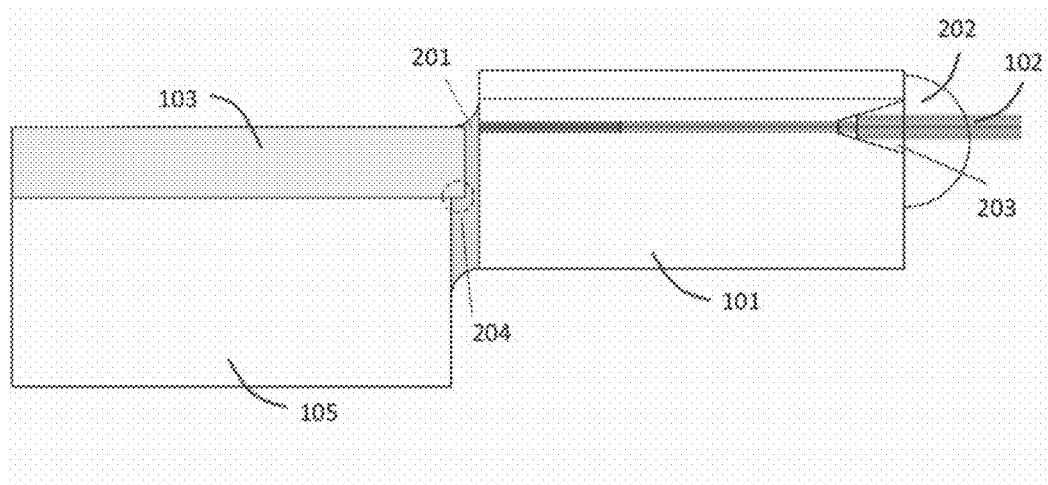
FIG. 2 is a pictorial representation illustrating a side view of the optical subassembly structure in accordance with an embodiment of the present invention.

FIG. 2 is a pictorial representation illustrating a side view of the optical subassembly structure 100 in accordance with one or more embodiments of the present invention. FIG. 2 also shows a side view of optical fiber subassembly (102) positioned inside glass capillary block (101). In particular, epoxy (201) is applied in the gap between the glass capillary block (101) and the edge of the semiconductor optical waveguide (104). Moreover, epoxy (201) is applied such that the edge of sub-mount (105) and semiconductor die (103) is off-set in a way that a larger amount of epoxy (201) stays between sub-mount (105) and glass capillary block (101). It is highlighted in circle (204).

Figure 3A:
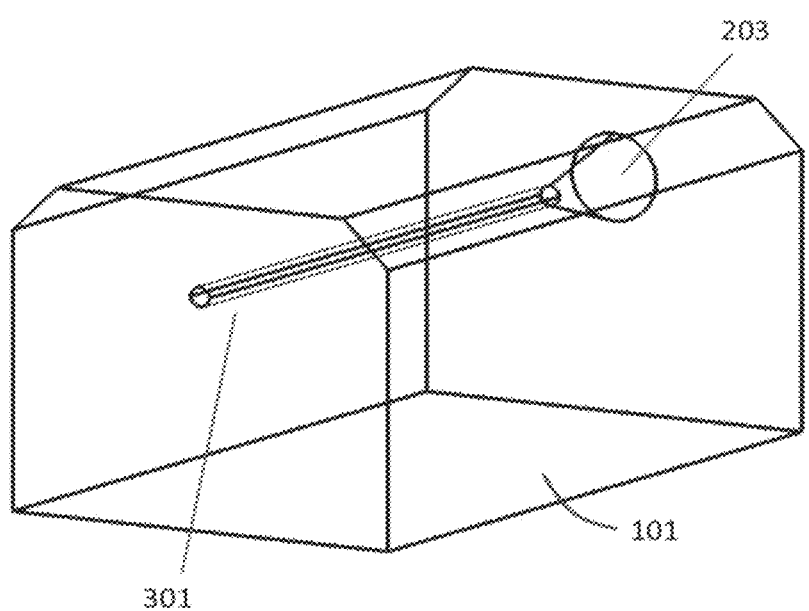
FIG. 3A is a pictorial representation illustrating an isotropic view of a glass capillary block in accordance with an embodiment of the present invention.
Figure 3B:
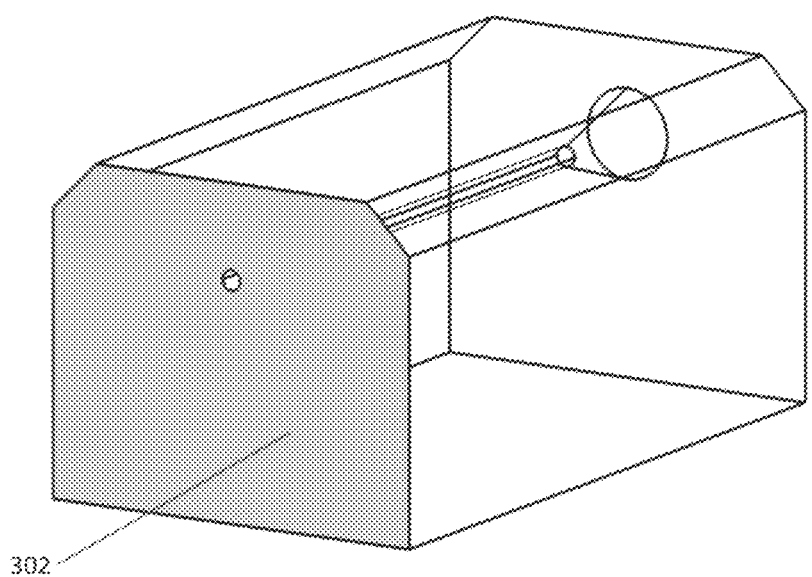
FIG. 3B is a pictorial representation illustrating the front side view of the glass capillary block in accordance with an embodiment of the present invention.
Figure 3C:
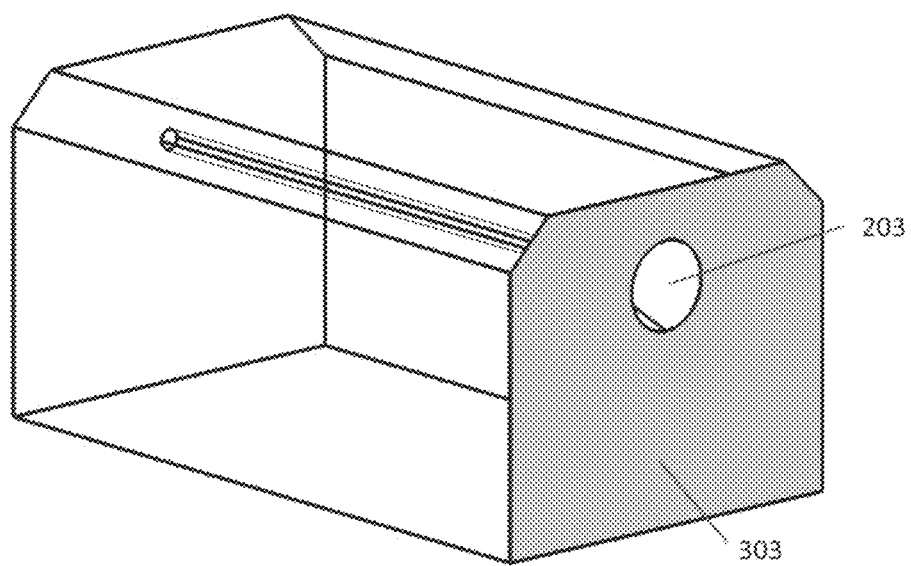
FIG. 3C is a pictorial representation illustrating the back side view of the glass capillary block in accordance with an embodiment of the present invention.

FIG. 3A, FIG. 3B and FIG. 3C are pictorial representations illustrating an isotropic, front side view and back side view of the glass capillary block in accordance with one or more embodiments of the present invention. In particular, the glass capillary block (101) is a glass block. Moreover, the glass capillary block (101) further includes a glass capillary tube (301) and a funnel-shaped hole (203). Furthermore, the center of the glass capillary tube (301) and funnel-shaped hole (203) are aligned co-linearly.

The front side view of the glass capillary block (101) in Fig.3B illustrates that the center of the glass capillary tube (301) is offset from the center of the capillary front surface (302).

The back-side view of the glass capillary block (101) in Fig.3B illustrates that the center of the funnel-shaped hole (203) is offset from the center of the back surface of the glass capillary block 303.

In accordance with an embodiment of the present invention, the position of the optical fiber subassembly in the glass capillary tube (301) and funnel-shaped hole (203) is offset from the center of the capillary front surface (302).

Although the outer shape of the glass capillary block (101) is not limited to any shape. However, irrespective of the outer shape of the glass capillary block (101) the capillary front surface (302) is a polished surface. Particularly, the capillary front surface (302) is perpendicular to semiconductor optical waveguide (104) and the glass capillary tube (301) at the same time.

In accordance with an embodiment of the present invention, the glass capillary tube (301) is a hollow glass capillary tube.

Figure 4A:
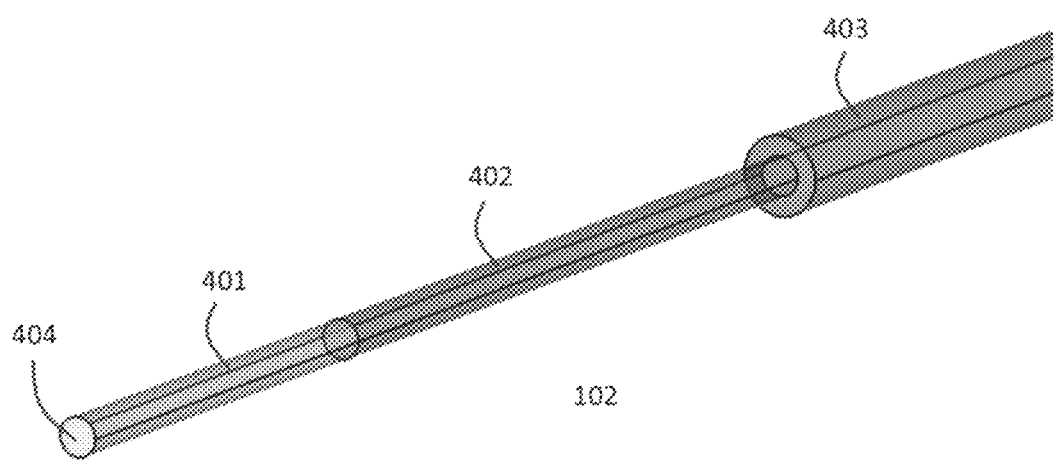
FIG. 4A is a pictorial representation illustrating an isotropic view of the optical fiber subassembly in accordance with an embodiment of the present invention.

FIG. 4A is a pictorial representation illustrating an isotropic view of the optical fiber subassembly in accordance with an embodiment of the present invention. In particular, FIG. 4A is an exemplary example of the optical fiber subassembly 102 having optical fibers (401, 404) fusion-spliced with the optical fiber (402) is enclosed in an optical fiber jacket (403).

Figure 4B:
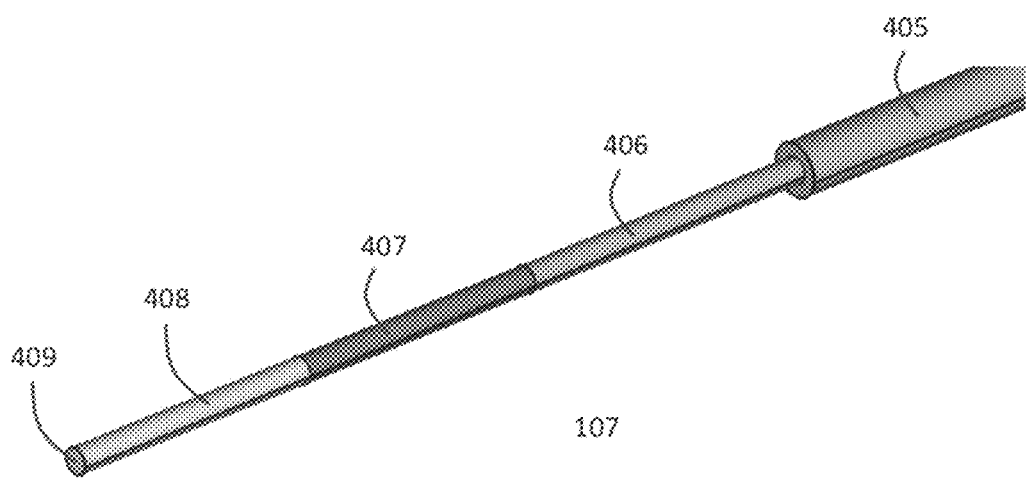
FIG. 4B is a pictorial representation illustrating an isotropic view of the optical fiber subassembly in accordance with an embodiment of the present invention.

FIG. 4B is a pictorial representation illustrating an isotropic view of the optical fiber subassembly in accordance with an embodiment of the present invention. In particular, the FIG. 4B is another exemplary example of the optical fiber subassembly (107) having three or more optical fibers fusion-spliced together. In particular, the optical fiber (405, 406, 407, 408, 409) are fusion spliced together.

Figure 5:
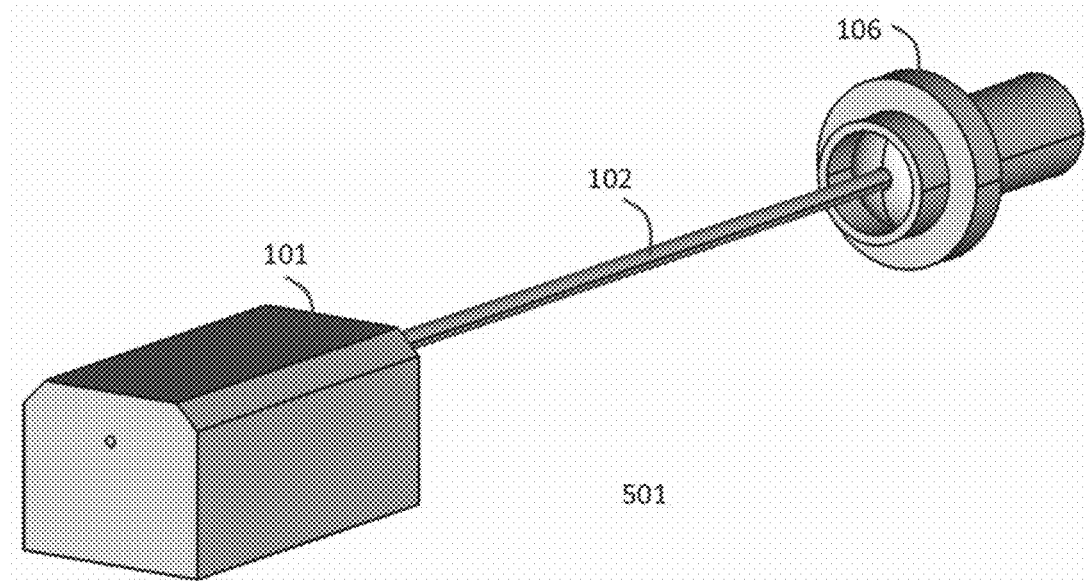
FIG. 5 is a pictorial representation illustrating the glass capillary subassembly in accordance with an embodiment of the present invention.

FIG. 5 is a pictorial representation illustrating the glass capillary subassembly in accordance with an embodiment of the present invention. In particular, the glass capillary subassembly (501) includes optical fiber subassembly (102 or 107), glass capillary block (101) and optical connector 106. Moreover, the optical fiber subassembly (102 or 107) further includes the optical fiber (402) fusion-spliced with one or more other optical fibers (401, 404, 405, 406, 407, 408, 409). Furthermore, the optical fiber subassembly (102 or 107) is enclosed in the glass capillary block (101).

In accordance with an embodiment, the glass capillary subassembly (102 or 107) in glass subassembly (501) is actively aligned to the semiconductor optical waveguide (104) and properly fixed by the epoxy (201). Then, light running in both transmit and receive direction is launched between optical fiber subassembly (102) and semiconductor optical waveguide (104).

In TOSA application, the outgoing light from the semiconductor optical waveguide (104), the mode field size of the outgoing light is converted within optical fiber subassembly (102) and is guided to optical connector (106) and outside. In ROSA application, reversely, incoming light coming from outside of the optical connector (106), the mode field size of incoming light is converted within the optical fiber subassembly (102) and is guided into semiconductor optical waveguide (104).

Figure 6:
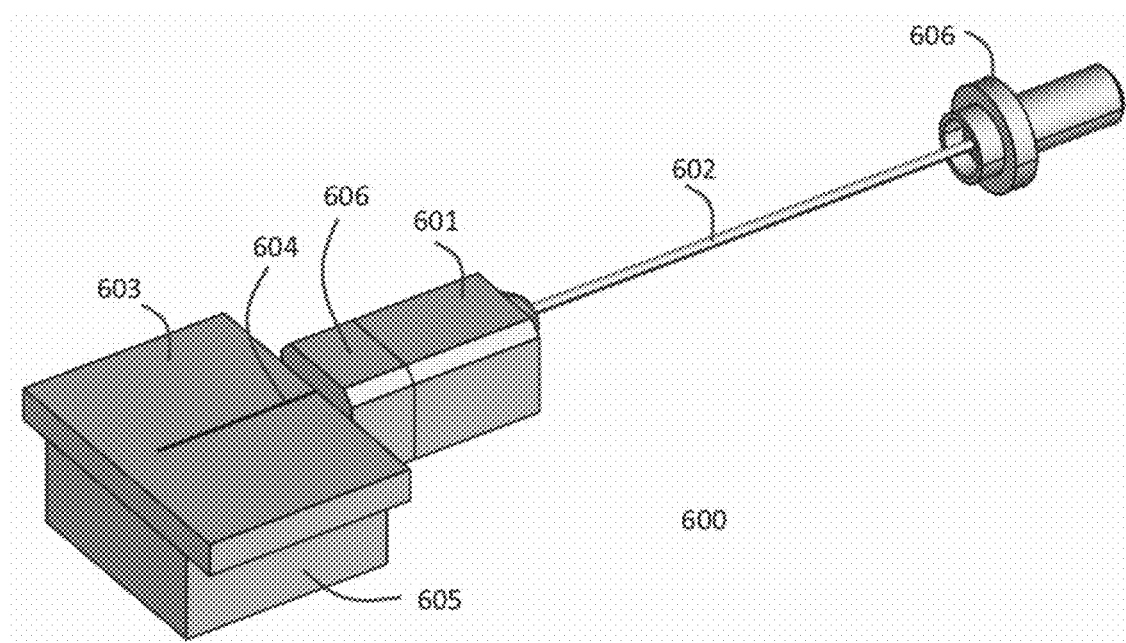
FIG. 6 is a pictorial representation illustrating an isotropic view of the optical subassembly structure in accordance with an embodiment of the present invention.

FIG. 6 is a pictorial representation illustrating an isotropic view of the optical subassembly structure in accordance with an embodiment of the present invention. In particular, the optical subassembly structure 600 includes a glass capillary block (601), a single optical fiber subassembly (602), semiconductor die (603), a sub-mount (605) and the external mode convertor block (606).

In accordance with an embodiment of the present invention, the external mode convertor block (606) is the optical connector.

Moreover, the single optical fiber subassembly (602) includes an optical fiber (802) with optical fiber jacket (803) enclosed in the glass capillary block (601).

Figure 7:
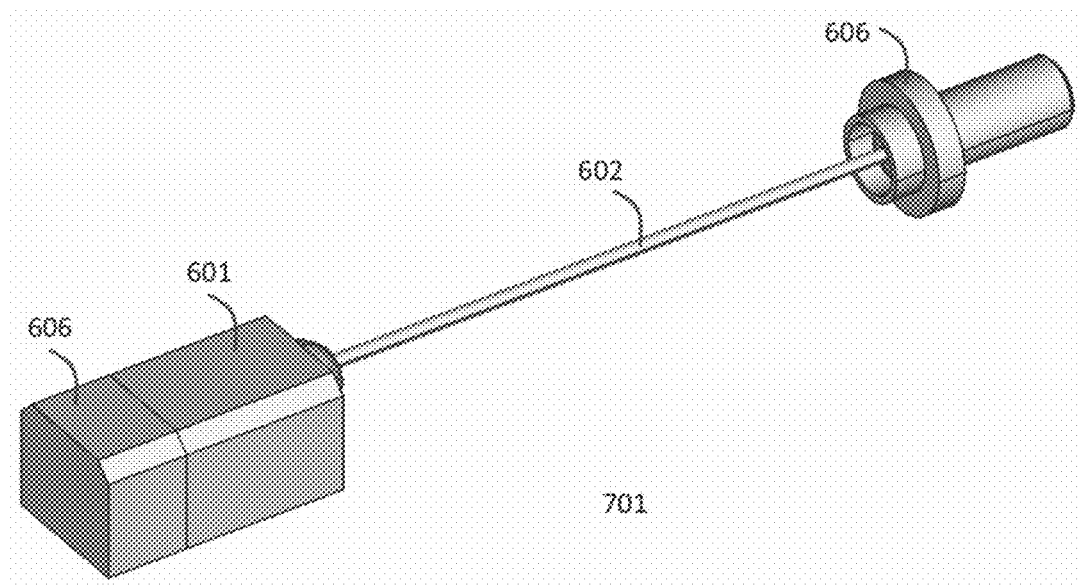
FIG. 7 is a pictorial representation illustrating the glass capillary subassembly in accordance with an embodiment of the present invention.

FIG. 7 is a pictorial representation illustrating the glass capillary subassembly structure in accordance with an embodiment of the present invention. In particular, the glass capillary subassembly 701 includes the external mode convertor block (606) and optical fiber subassembly (602) is enclosed inside glass capillary block (601). Moreover, the external mode convertor block (606) is attached to the capillary front surface of the glass capillary block (601).

In accordance with one or more embodiments of the present invention, the optical fiber subassembly (102 or 107) is replaced with the single optical fiber subassembly (602).

Figure 8:
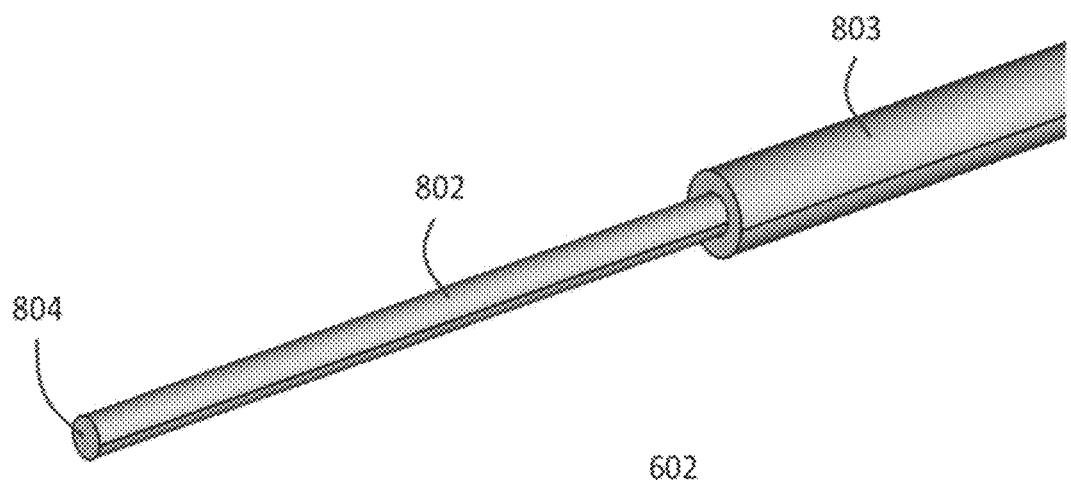
FIG. 8 is a pictorial representation illustrating an isotropic view of the optical fiber subassembly in accordance with an embodiment of the present invention.

FIG. 8 is a pictorial representation illustrating an isotropic view of the single optical fiber subassembly structure in accordance with an embodiment of the present invention. The single optical fiber subassembly (602) includes an optical fiber (802) with optical fiber jacket (803).

In accordance with one or more embodiments of the present invention, the glass capillary block (101) is used for single channel application and the glass capillary array block (901) is used for multiple channel applications. Some exemplary examples of multi-channel applications using glass capillary array blocks are illustrated in FIG. 9-FIG. 12 for better understanding.

Figure 9:
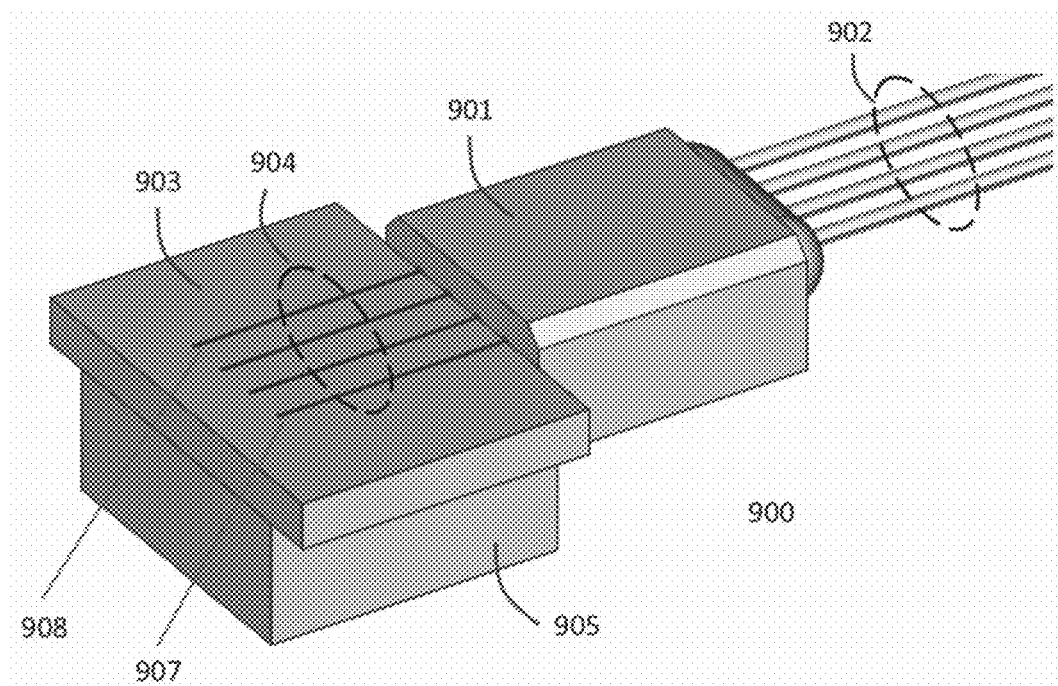
FIG. 9 is a pictorial representation illustrating an isotropic view of the optical subassembly structure in accordance with an embodiment of the present invention.

FIG. 9 is a pictorial representation illustrating an isotropic view of the optical subassembly structure in accordance with an embodiment of the present invention. In particular, the optical subassembly structure 900 includes a glass capillary array block (901) having a plurality of optical fibers (902), the semiconductor die (903), two semiconductor optical waveguides (907, 908) and a waveguide array (904). Moreover, the number of semiconductor optical waveguides (907,908) on the semiconductor piece (903) are the same in number as the plurality of optical fibers (902). Furthermore, the two optical waveguides (907, 908) are located at two far ends of the waveguide array (904) in an active alignment. And, the best coupling is obtained when optical power received at waveguide (907, 908) reaches its peak.

Figure 10:
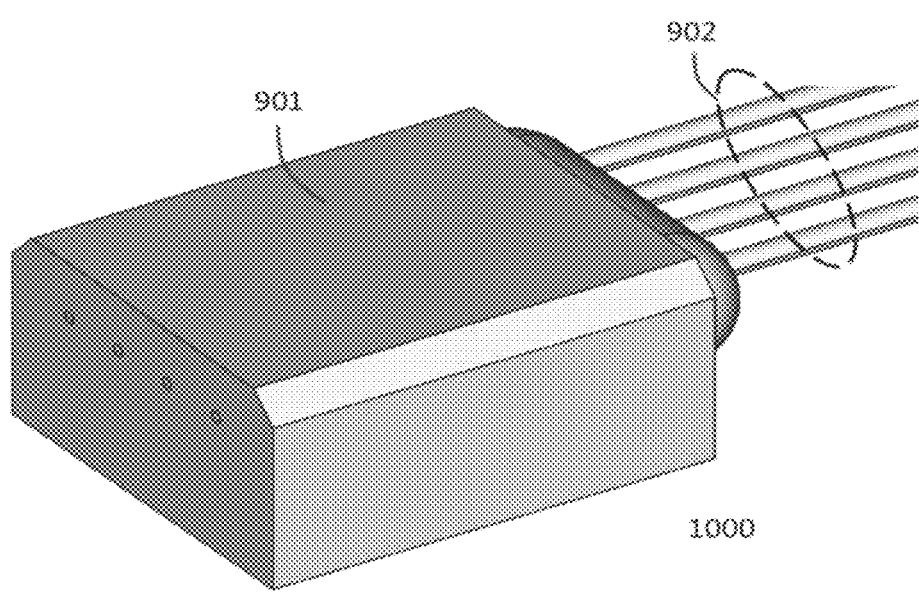
FIG. 10 is a pictorial representation illustrating an isotropic view of the glass capillary array subassembly in accordance with an embodiment of the present invention.

FIG. 10 is a pictorial representation illustrating an isotropic view of the glass capillary array subassembly in accordance with an embodiment of the present invention. The glass capillary array subassembly 1000 includes a glass capillary array block (901) having a plurality of optical fibers (902).

In accordance with another embodiment of the present invention, the plurality of optical fibers may be equidistant optical fibers.

Figure 11A:
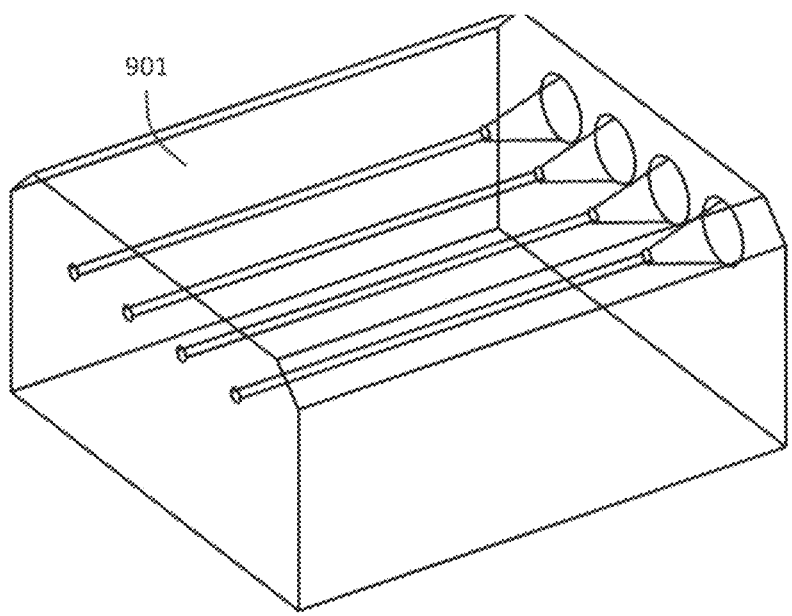
FIG. 11A is a pictorial representation illustrating an isotropic view of a glass capillary array in accordance with an embodiment of the present invention.

FIG. 11A is a pictorial representation illustrating an isotropic view of a glass capillary array block in accordance with an embodiment of the present invention. In particular, the glass capillary array block (901) includes a plurality of optical fibers (902) enclosed inside the glass capillary array block (901).

Figure 11B:
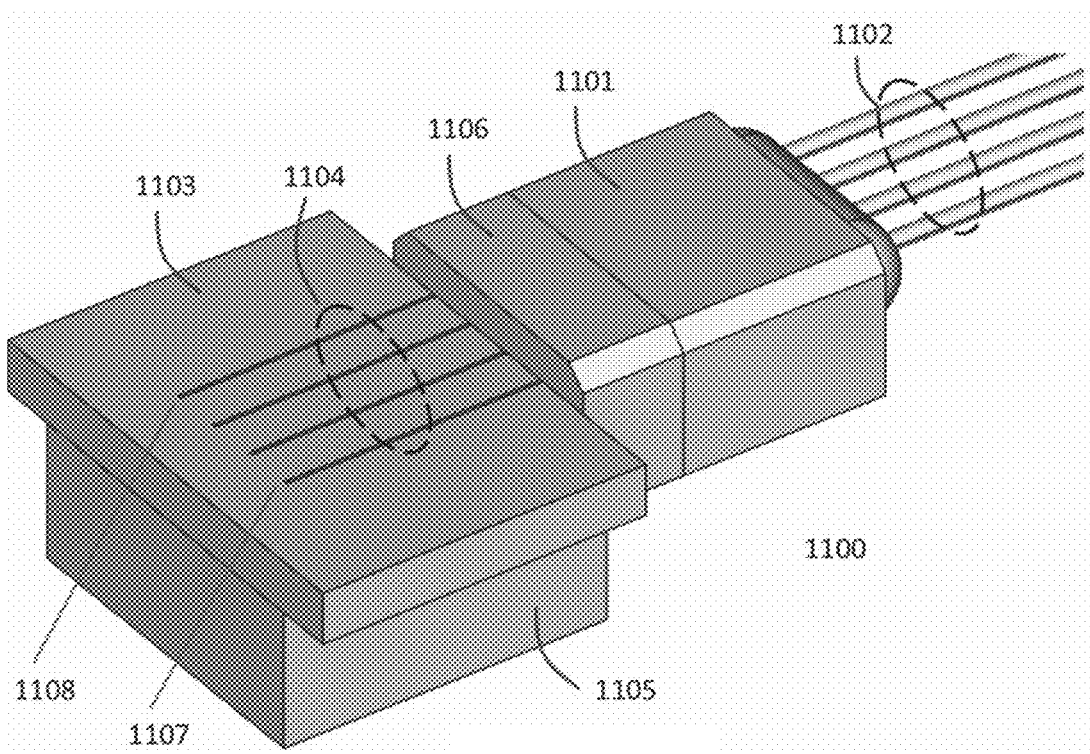
FIG. 11B is a pictorial representation illustrating an isotropic view of the optical subassembly structure in accordance with an embodiment of the present invention.

FIG. 11B is a pictorial representation illustrating an isotropic view of the optical subassembly structure in accordance with an embodiment of the present invention. In particular, the optical subassembly structure 1100 includes a glass capillary array block (1101) having a plurality of optical fibers (1102), an external mode convertor (1106), the semiconductor die (1103) and the sub mount (1105). Moreover, the plurality of optical fibers (1102) are formed with two or more single optical fiber subassembly (602).

Figure 12:
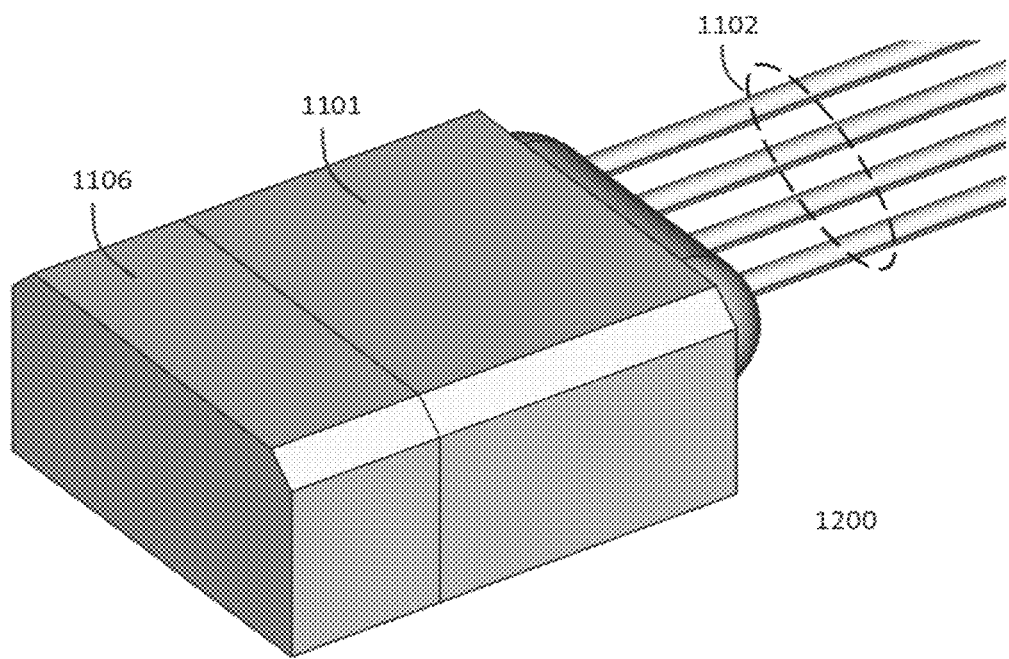
FIG. 12 is a pictorial representation illustrating an isotropic view of the glass capillary array subassembly in accordance with an embodiment of the present invention.

FIG. 12 is a pictorial representation illustrating an isotropic view of the glass capillary array subassembly in accordance with an embodiment of the present invention. In particular, the glass capillary array subassembly 1200 further includes a glass capillary array block (1101) having a plurality of optical fibers (1102) and the external mode convertor (1106).

In accordance with an embodiment of the present invention, the external mode convertor (606,1106) is in a form compatible with glass capillary block (601,1101) and is attached to the capillary front surface (302) of glass capillary block (601,1101).

In accordance with an embodiment of the present invention, the fiber position in the glass capillary block (101, 601, 901, 1101) is offset from the capillary front surface (302) center. In particular, the weight of glass capillary subassembly (501, 701, 1000, 1100) is shared by semiconductor die (103, 603, 903, 1103) and sub-mount (105, 605, 905, 1105).

In accordance with an embodiment of the present invention, the optical subassembly structure further includes direct butt coupling of the glass capillary subassembly with the semiconductor optical waveguide at an edge of the semiconductor die.

In accordance with one embodiment of the present invention, the optical fiber subassembly is anyone of a single optical fiber subassembly and a multi-optical fiber subassembly.

In particular, accordance with one embodiment of the present invention, the optical fiber subassembly is the single optical fiber subassembly and includes an optical fiber enclosed in an optical fiber jacket. In particular, the single optical fiber subassembly has one optical fiber selected from the plurality of the optical fibers.

In accordance with another embodiment of the present invention, the optical fiber subassembly is the multi-optical fiber subassembly and includes a plurality of optical fibers fusion spliced with at least one optical fiber enclosed in the optical fiber jacket. In the plurality of optical fibers is selected from an optical fiber enclosed in an optical fiber jacket and an optical fiber enclosed in the glass capillary tube.

In accordance with an embodiment of the present invention, the glass capillary subassembly further includes a mode convertor. And the mode convertor is an internal mode convertor and an external mode convertor.

In accordance with an embodiment of the present invention, the multi-optical fiber subassembly inserted in the glass capillary tube of the glass capillary block acts as the internal mode convertor.

In accordance with an embodiment of the present invention, the external mode convertor is active aligned to the single optical fiber subassembly. Moreover, the external mode convertor is positioned on a front surface of the glass capillary block.

In accordance with an embodiment of the present invention, the distance between the sub-mount and the glass capillary block is less than 1 mm.

In accordance with an embodiment of the present invention, the optical subassembly structure further comprises the glass capillary array block, at least two semiconductor optical waveguides, a waveguide array.

In accordance with an embodiment of the present invention, the waveguide array includes the two optical waveguides at two far ends and optical waveguide in between the two optical waveguides.

In accordance with an embodiment of the present invention, the front surface of a glass capillary tube and the front surface of the optical fiber subassembly aligns in a coplanar plane.

In accordance with an embodiment of the present invention, the glass capillary subassembly includes a glass capillary block, an optical fiber subassembly.

In accordance with another embodiment of the present invention, the glass capillary subassembly includes an optical connector.

In accordance with an embodiment of the present invention, the glass capillary block further includes a glass capillary tube and a funnel-shaped hole. In particular, the glass capillary tube is positioned co-linearly to the funnel-shaped hole.

In accordance with an embodiment of the present invention, the optical fiber subassembly is active-aligned to the optical waveguide.

In accordance with an embodiment of the present invention, the size of the sub-mount is smaller than the semiconductor die.

In accordance with an embodiment of the present invention, the glass capillary block is a glass capillary array block. In particular, the glass capillary array block further includes a plurality of optical fibers.

In accordance with another embodiment of the present invention, the plurality of optical fibers may be equidistant optical fibers.

In accordance with an embodiment of the present invention, the optical subassembly structure further comprises the glass capillary array block, a waveguide array. In particular, the waveguide array includes the two optical waveguides at two far ends and optical waveguide in between the two optical waveguides.

In accordance with an embodiment of the present invention, the front surface of the glass capillary tube and the front surface of the optical fiber subassembly align in a coplanar plane.

In accordance with an embodiment of the present invention, the optical fiber subassembly is placed in the centre of the glass capillary block from the front surface of the glass capillary tube.

In accordance with an embodiment of the present invention, particularly in TOSA application, the mode field size of the outgoing light is converted within optical fiber subassembly and is guided to optical connector and outside.

In accordance with an embodiment of the present invention, particularly in the ROSA application, the mode field size of incoming light is converted within the optical fiber subassembly and is guided into semiconductor optical waveguide.

In accordance with one embodiment of the present invention, the optical fiber subassembly is anyone of a single optical fiber subassembly and a multi-optical fiber subassembly. In particular, the single optical fiber subassembly includes an optical fiber enclosed in an optical fiber jacket. And, the multi-optical fiber subassembly includes a plurality of optical fibers fusion spliced with at least one optical fiber enclosed in the optical fiber jacket.

In accordance with an embodiment of the present invention, the glass capillary subassembly further includes a mode convertor. And the mode convertor is an internal mode convertor and an external mode convertor. In particular, the multi-optical fiber subassembly inserted in the glass capillary tube of the glass capillary block acts as the internal mode convertor.

In accordance with an embodiment of the present invention, the optical subassembly structure further comprises the glass capillary array block, at least two semiconductor optical waveguides, a waveguide array.

In accordance with an embodiment of the present invention, the waveguide array includes the two optical waveguides at two far ends and optical waveguide in between the two optical waveguides.

In accordance with an embodiment of the present invention, the front surface of a glass capillary tube and the front surface of the optical fiber subassembly aligns in a coplanar plane.

Thus, the embodiments of the present invention provide optical subassembly structure for mode conversion by an active alignment of an optical fiber with a semiconductor optical waveguide. In particular, the approach for achieving comparable coupling performance by active alignment of an optical fiber with a semiconductor optical waveguide in the optical subassembly structure in the present is an economic and relatively very inexpensive. Other advantages include compact size, simple and fast assembly.

What is claimed is:

1. An optical subassembly structure for mode conversion by an active alignment of an optical fiber with a semiconductor optical waveguide, the optical subassembly structure comprising: a sub-mount for holding the optical subassembly structure; a semiconductor die mounting on the sub-mount; the semiconductor optical waveguide grown on the semiconductor die; and a glass capillary subassembly actively aligned to the semiconductor optical waveguide, wherein the glass capillary subassembly further comprises a glass capillary block, and an optical fiber subassembly, the glass capillary block further comprises a glass capillary tube extending from a front surface and a funnel-shaped hole extending from a back surface that is opposite the front surface, the glass capillary tube is positioned co-linearly to the funnel-shaped hole where the center of the funnel-shaped hole is offset from the center of the back surface of the glass capillary block.

2. The optical subassembly structure as claimed in claim 1, wherein the glass capillary block is a glass capillary array block.

3. The optical subassembly structure as claimed in claim 2, wherein the glass capillary array block further comprises a plurality of optical fibers.

4. The optical subassembly structure as claimed in claim 3, wherein the optical subassembly structure further comprises the glass capillary array block, at least two semiconductor optical waveguides, and a waveguide array.

5. The optical subassembly structure as claimed in claim 4, wherein the waveguide array further comprises an optical waveguide in between the at least two semiconductor optical waveguides.

6. The optical subassembly structure as claimed in claim 1, wherein the optical fiber subassembly is any one of a single optical fiber subassembly and a multi-optical fiber subassembly.

7. The optical subassembly structure as claimed in claim 6, wherein the single optical fiber subassembly further comprises an optical fiber enclosed in an optical fiber jacket.

8. The optical subassembly structure as claimed in claim 6, wherein the multi- optical fiber subassembly comprises a plurality of optical fibers fusion spliced with at least one optical fiber enclosed in an optical fiber jacket.

9. The optical subassembly structure as claimed in claim 1, wherein the glass capillary subassembly further comprises a mode convertor.

10. The optical subassembly structure as claimed in claim 9, wherein the mode convertor is any one of an internal mode convertor and an external mode convertor.

11. The optical subassembly structure as claimed in claim 6, wherein the optical fiber subassembly inserted in a glass capillary tube of the glass capillary block acts as internal mode convertor.

12. The optical subassembly structure as claimed in claim 10, wherein the external mode convertor is actively aligned to a single optical fiber subassembly on a front surface of the glass capillary block.

13. The optical subassembly structure as claimed in claim 6, wherein the optical fiber subassembly is actively aligned to the semiconductor optical waveguide.

14. The optical subassembly structure as claimed in claim 1, wherein the glass capillary subassembly further comprises an optical connector.

15. The optical subassembly structure as claimed in claim 1, wherein a front surface of the glass capillary tube and a front surface of the optical fiber subassembly aligns in a coplanar plane.

16. The optical subassembly structure as claimed in claim 1, wherein a distance between the sub-mount and the glass capillary block is less than 1 mm.

17. The optical subassembly structure as claimed in claim 1, wherein the optical subassembly structure further comprises a direct butt coupling of the glass capillary subassembly with the semiconductor optical waveguide at an edge of the semiconductor die.

* * * * *